Sept. 17, 1940.                E. T. RAGSDALE                 2,214,937
                              SPARE TIRE MOUNTING
                           Filed Nov. 1, 1939          2 Sheets-Sheet 1
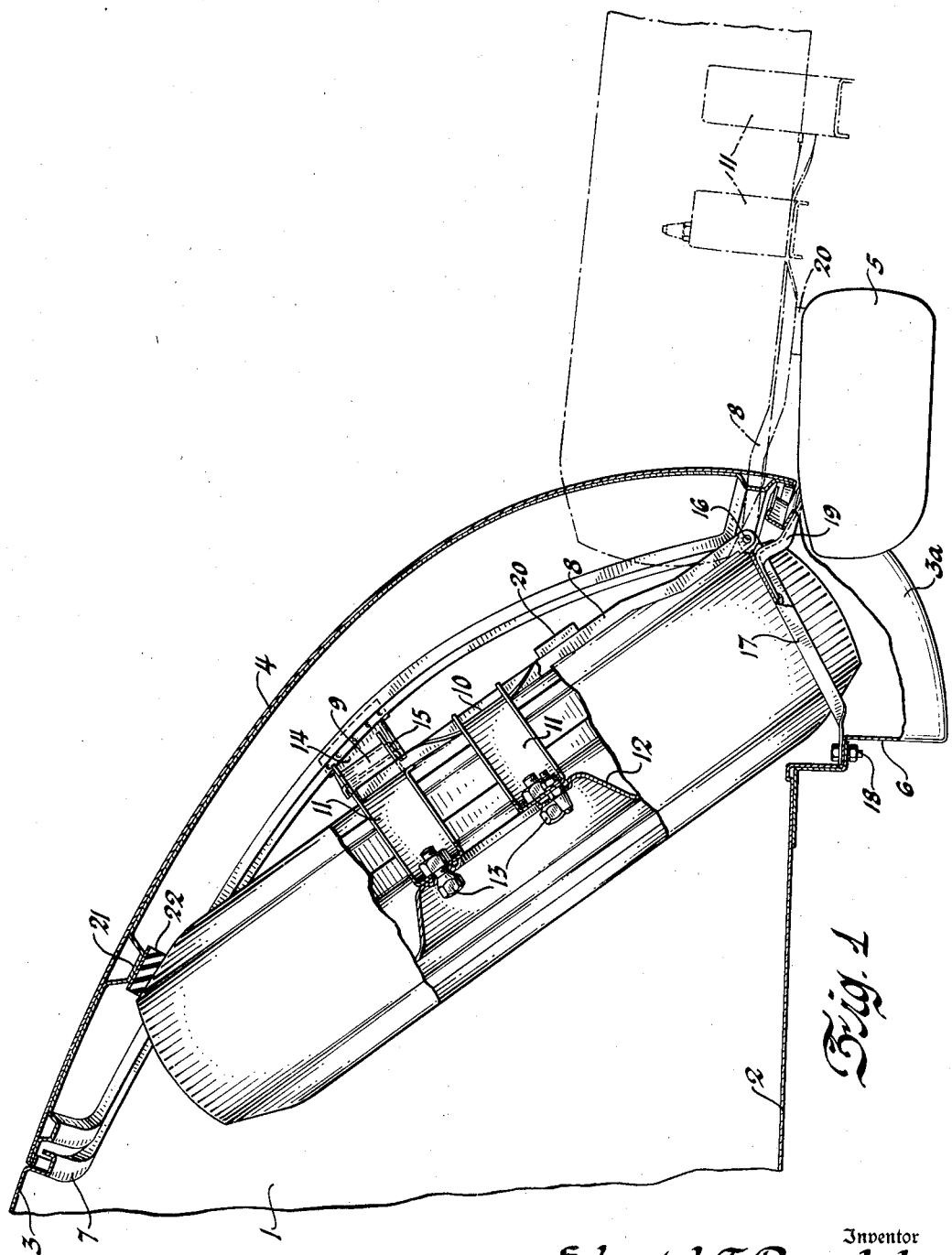
Inventor
Edward T. Ragsdale
By
Blackmore, Spencer & Flint
Attorneys

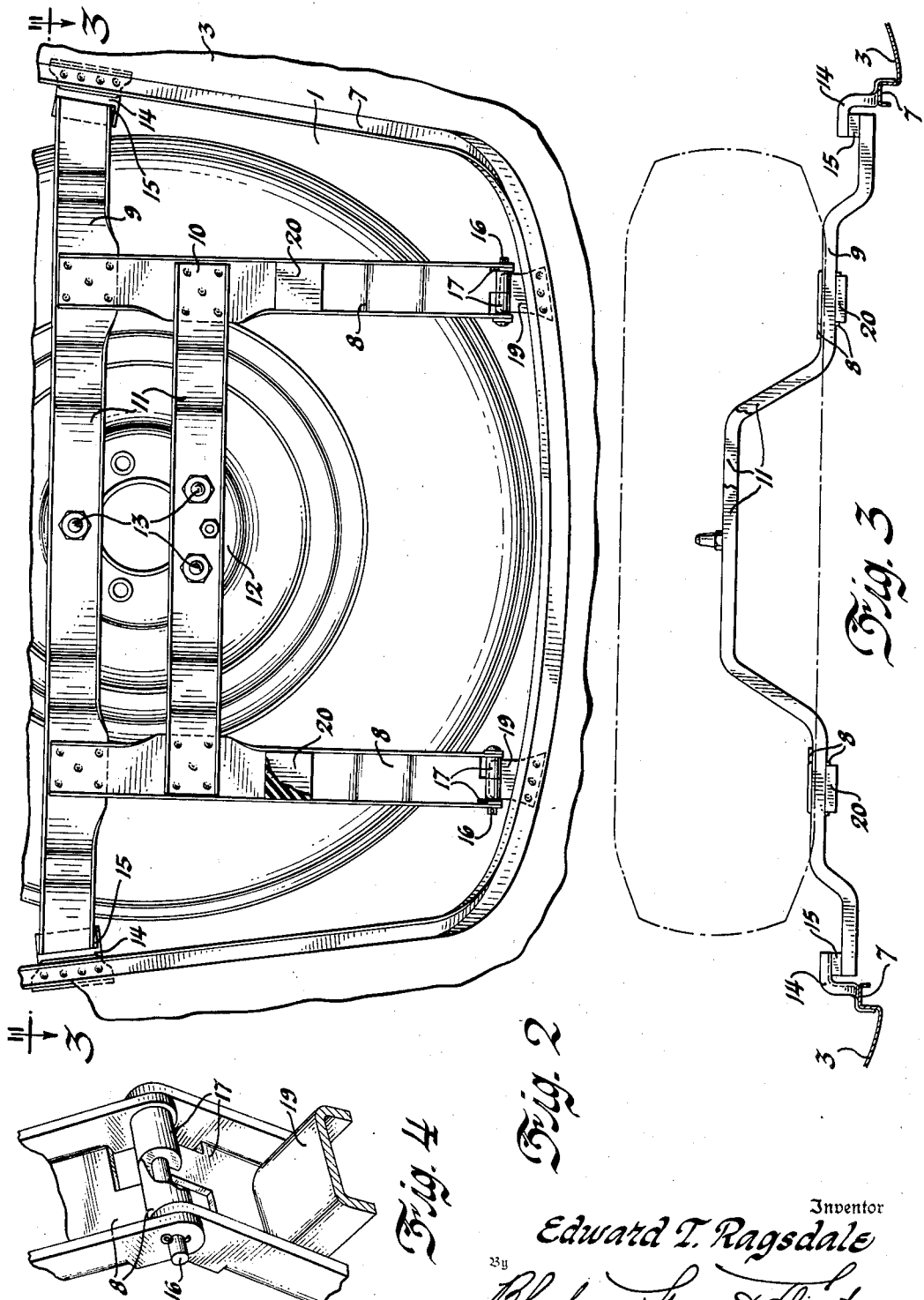

Patented Sept. 17, 1940

2,214,937

UNITED STATES PATENT OFFICE 2,214,937

SPARE TIRE MOUNTING

Edward T. Ragsdale, Flint, Mich.

Application November 1, 1939, Serial No. 302,404

6 Claims. (Cl. 296—37)

Automobile bodies of today have a storage compartment at the rear to contain the spare tire, the necessary tools and whatever luggage is to be carried. Styling contour and mechanical interference limit the space available and in many instances the size of the spare tire in relation to the compartment space has resulted in clumsy and awkward use of the space. It is an object of the present invention to provide a storage compartment arrangement which fits in with the mechanical and appearance design factors to take fuller advantage of the compartment space and to afford a flat load platform for luggage and which also enables more convenient access both to the luggage platform and to the spare tire as well as the tool chest.

A further object of the invention is to provide a structure wherein a tire rack or supporting frame is located immediately inside the compartment closure door for outward and downward swinging movement when the door is opened, for easy access to the loading space, and wherein the tire is secured on the inner side of the support so that the support may be pivotally mounted at the lower rearmost extremity of the compartment and the tire attachment fastenings, when the support is swung outwardly, may be reached from above to facilitate removal and replacement of an extra tire.

Other objects and advantages will become apparent during the course of the following specification having reference to the accompanying drawings wherein Figure 1 is a longitudinal vertical section at the rear end of the body; Figure 2 is an elevation looking toward the tire rack with the compartment lid opened; Figure 3 is a fragmentary view looking in the direction of the arrows on line 3—3 of Figure 2 and Figure 4 is a detail perspective of the pivot mounting of the rack.

The hollow tail of the body provides the storage space indicated at 1 and the major portion of the floor of the compartment comprises a flat loading platform 2 located above the chassis frame at and rearwardly of the usual hump over the rear axle. The deck panel 3 together with the closure door or lid 4, sweeps rearwardly and downwardly, and just ahead of the customary impact bumper 5, the panel curves downwardly and forwardly as at 3a and is connected by a vertical wall 6 to the rear end of the platform 2. This rearward portion of the compartment floor thus constitutes a depressed well or pocket, a portion of which may be used conveniently as a tool chest. Hinges, not shown, connect the upper portion of the door or lid 4 to the panel 3 for the outward and upward swinging movement of the door about a transverse horizontal axis to permit access to the compartment 1. The door opening in the panel 3 is defined by an encircling drip or drain trough 7 and extends throughout the major portion of the downward sweeping portion of the panel to a point just above the top of the bumper 5.

Pivoted immediately adjacent the rearmost extremity of the compartment and immediately above the lower edge of the door opening is the tire supporting rack or frame which extends upwardly in an inclined plane substantially parallel with the general plane containing the door 4. The frame includes a pair of upright rails 8—8 formed of channel section for strength and which are tied together at their upper ends by a pair of spaced channel sectioned rails 9 and 10. The connections between the several rails is by spot welding overlapping web portions and at the crossings, the adjacent portions of the side flanges are bent down for clearance. Both cross bars 9 and 10 have their central portions forwardly bowed or offset as at 11, to project into the central space of a spare tire assembly, which as shown in the drawings includes the wheel 12 having a series of hub attachment openings through certain of which the fastening bolts 13 may pass. By this means the spare tire is removably secured on the inner side of the swinging frame with its lower portion projecting below the level of the floor 2 and into the depressed well at the rear of the compartment. For locating the frame in proper position within the compartment the ends of the uppermost bar 9 extend outwardly beyond the periphery of the tire and bear against a pair of abutment brackets 14 welded to the drip channel 7. For cushioning the seating engagement and compensating for slight inaccuracies, a resilient pad 15 of rubber or the like may be cemented to the seating surface of each bracket 14.

The pivotal mounting for the swinging frame is provided by a pair of transversely spaced brackets to which the lower ends of the uprights 8—8 are fastened by pivot pins 16. Each mounting bracket may consist of a channel sectioned bar 17 fastened at its forward end by the stud 18 to an offset in the vertical wall 6 and supported at its rear end by a suitable bracket 19 welded both to the bar 17 and an adjacent portion of the drain trough 7. The side flanges of the cooperating bar 17 and upright 8 are fitted side by side and formed with aligned openings for the passage of the pintle 16. In addition one-half of the web of each of the pieces 8 and 17 may be removed and the remaining portion curled upon itself to provide a cylindrical eye with the two eyes fitted side by side in embracing relation to the pintle pin.

When the door 4 is opened the tire rack with the tire assembly fastened thereto may be swung rearwardly out of the door opening to the horizontal position illustrated by broken lines in Figure 1 to permit convenient access to the luggage space ahead of the spare tire. The luggage need not be removed in the event a tire change is necessary and access to the fastening attachments of the tire may be had from above when the rack is swung to a horizontal position. Since the tire will nest naturally on the downswung rearwardly projecting rack the wheel removal and replacement operations are easily handled. As seen in Figure 1, in the projected position of the rack, use is made of the bumper 5 as a steady rest for supporting the rack in horizontal position. As a buffer or cushion between the bumper 5 and the rack, the resilient cushions 20 of rubber or the like, are cemented to the outer faces of the uprights 8—8 for engagement with the upper edge of the bumper bar. The mounting of the tire on the inner face of the rack and the pivotal mounting of the rack at the rearmost extremity of the compartment in addition to simplifying the manipulation of the parts assist in conserving space and getting the utmost out of the space available.

In the normal load carrying position the inclination of the rack will, by reason of its weight, maintain the side extending arms of the rack in engagement with the seating abutment brackets 14. As a precaution against bouncing of the assembly it may be desirable to provide the abutment 21 including the rubber cushion 22 on the inside of the door 4 for engagement with the upper portion of the tire assembly. The indicated disposition of the abutment 21 has been selected because the door at this point approaches most nearly to the tire and rack assembly but it will be apparent that if it is desired the placement of the retaining abutment may be shifted so that instead of engaging with the tire the engagement will be made directly with the rear side of the rack. This latter would be of advantage if no spare tire is carried on the rack, but since such is not the usual practice, the more convenient location of the retaining abutment is employed as illustrated.

I claim:

1. In an automobile body having an end storage space and a closure for the access opening thereto, a hinged support within the space immediately adjacent said opening, a mounting seat on the inner face of the support, means associated with said inwardly facing seat for detachably mounting a spare tire assembly on the inner side of the support, means hinging the support for outward and downward movement through said opening to render said tire and tire attachment means on the inner side of the support accessible from above the outwardly projected support, locating abutment rests on the support and body, respectively, and means carried by the closure to maintain said abutment rests in engagement when the closure is in closed position.

2. Means to carry a spare tire assembly within the storage compartment of an automobile body, including a supporting frame arranged for securing a spare tire assembly on its inner face, means hingedly mounting the frame for swinging movement into and out of the compartment, a pair of side brackets carried by the body for engagement by the frame when the frame is within the compartment and a compartment closure door having means to maintain the frame in engagement with said side brackets.

3. The combination with an automobile body having a closure door for a storage compartment, of a spare tire support located within the compartment and behind the door, inwardly facing means for securing a spare tire on the inner side of said support remote from the closure door and means hingedly mounting the support for outward swinging when the door is opened to present the tire securing means on the upper side of the outwardly swung support for access thereto from above.

4. In combination, an automobile body storage compartment having a closure door and a floor, said floor comprising a luggage supporting platform and a depressed well between the platform and the door to receive the lower portion of a spare tire, an outwardly swingable tire support hingedly mounted at the rear of the well and means on the inner side of the support to mount a spare tire.

5. In an automobile body, an outwardly and upwardly swinging door for the access opening of a storage compartment, a tire support mounted inside the door for outward and downward swinging movement through the door opening, attachment means to suspend a tire on the support on the side thereof remote from the door, a fixed abutment within the compartment for seating engagement with a portion of the support, a resilient buffer associated with the complementary seating surfaces of said abutment and support and a resilient buffer carried by the door to engage the tire and serve as a holddown for the support when the door is closed.

6. In an automobile body having a storage compartment and a closure door for the compartment opening, a rigid frame located next to the door and within the compartment for suspending a spare tire on the inner face thereof, said frame including a pair of transversely spaced legs hinged at their lower ends on a common transverse horizontal axis near the bottom of said opening and a cross bar tying the upper ends of the legs together and extending transversely across said opening, frame locating seats at the sides of the compartment opening for engagement by opposite ends of said cross bar and tire retaining means on the inner face of the frame for mounting a spare tire inwardly of said hinged frame.

EDWARD T. RAGSDALE.